United States Patent [19]
Lee et al.

[11] Patent Number: 5,271,003
[45] Date of Patent: Dec. 14, 1993

[54] INTERNAL ROUTING METHOD FOR LOAD BALANCING

[75] Inventors: Keun K. Lee; Jin Y. Choi; Young S. Cho; Hyeong H. Lee, all of Daejeon, Rep. of Korea

[73] Assignees: Electronics and Telecommunications Research Institute; Korea Telecommunication Authority, Rep. of Korea

[21] Appl. No.: 491,448

[22] Filed: Mar. 9, 1990

[30] Foreign Application Priority Data

Mar. 11, 1989 [KR] Rep. of Korea ............... 1989-3067

[51] Int. Cl.$^5$ ............................................. H04J 3/14
[52] U.S. Cl. ............................................. 370/58.2; 370/16
[58] Field of Search ................. 370/94.1, 110.1, 60, 370/60.1, 94.2, 16, 58.2

[56] References Cited

U.S. PATENT DOCUMENTS

| | | | |
|---|---|---|---|
| 4,780,873 | 10/1988 | Mattheyses | 370/94.1 |
| 4,885,738 | 12/1989 | Bowers et al. | 370/110.1 |
| 4,893,302 | 1/1990 | Hemmady et al. | 370/60 |
| 5,048,081 | 9/1991 | Gavaras et al. | 370/60.1 |
| 5,093,825 | 3/1992 | Helsmoortel et al. | 370/110.1 |

*Primary Examiner*—Douglas W. Olms
*Assistant Examiner*—Melvin Marcelo
*Attorney, Agent, or Firm*—Blakely, Sokoloff, Taylor & Zafman

[57] ABSTRACT

An internal routing method in an internal network for improving signaling message processing capability by balancing the workload among message handling processors (MHP) in common channel signaling system used in electronic exchanges. An internal routing algorithm is provided in the internal network to balance the workload among MHP's based on the characteristics of a circuit identification code (CIC). An identifying trunk circuit is uniformly distributed, and a load unbalancing factor is formulated approximately as a function of the number of failed MHP's as a worst case. With this approach, all MHP's are loaded almost equally regardless of the number of failed MHP's.

4 Claims, 7 Drawing Sheets

INTERNAL ROUTING METHOD FOR LOAD BALANCING

BACKGROUND OF THE INVENTION

The present invention relates to an internal routing method in the internal network for improving signaling message processing capability by balancing the workload among message handling processor(MHP) in common channel signaling(CCS) system used in electronic exchanges.

Description of the prior art with reference to FIG. 1-3 will be shown hereinafter.

FIG. 1 illustrates relations between CCITT NO. 7 functional level structures and OSI(Open System Interconnection) layers. In common channel signalling CCITT NO. 7, there are level 1 signaling data link functions, Level 2 signaling Link functions, Level 3 signaling network functions and level 4 user part functions. The user part functions are largely divided into functions of essential parts for applications, ISDN user part functions, and telephone user part functions, which are shown in comparison with 7 layers proposed by OSI in this figure. An arrangement for performing such common channel signalings may take its own structure depending on the types of realizations.

FIG. 2 illustrates diagrammatically the configuration of a common channel signaling system in electronic exchanges. This system comprises signaling data links for performing the level 1 functions, signaling terminals(ST) for performing level 2 functions, message handling processors for performing level 3 functions and user part processors for performing level 4 functions. Also, this system comprises a message transfer network(MTN) providing communication paths between signaling terminals and message handling processors, and a control interworking network(CIN) providing communication paths between user part processors and message handling processors.

Thus all of the signaling terminals and all of the user part modules can communicate with any message handling processors through these networks.

In the system of FIG. 2, the signaling terminals receive the signaling messages from remote exchanges through the signaling data Link, and after processing the level 2 protocol, and send the received signaling messages are sent to the message handling processors via the message transfer network. The message handling processors send these signaling messages to the user part processors via the control interworking network after performing the signaling message handling functions of the level 3 protocol. On the other hand, the signaling messages generated from the user parts of the own exchange are sent to the message handling processors via the control interworking network. The message handling processors send these signaling messages to the signaling terminals via the message transfer network after performing the level 3 protocol, and the signaling terminals transmit them to the remote exchange through the signaling data link.

The routing from the message handling processors to the user parts in the incoming routing for signaling messages from the remote exchange, and the routing from the message handling processors to the signaling terminals in the outgoing routing for signaling messages to the remote exchange are performed on the basis of the specification of the CCITT No. 7 protocols. However, proper methods may be applied to the routing from the signaling terminals to the message handling processors in incoming routing and to the routing from the user parts to the message handling processors in outgoing routing.

Thus, the routing from the signaling terminals to the message handling processors and from the user parts to the message handling processors may be performed by optionally established methods, and allotment of load to the message handling processors also may be achieved by means of these methods. Although a simple method may be utilized in which routing can be achieved by optionally associating the message handling processors with the respective user parts or with the signaling terminals, such a method has a problem that it is difficult to equally assign the traffic load to the message handling processors in the case that there are failed message handling processors. Also, in the existed routing methods, when successive failures of the message handling processors occurred, the system exhibits centralization of load, thereby degrading the performances of the message handling processors. Consequently, the degree of uniform distribution of load has great influence on the performances of the message handling processors, and hence on the total performance of the common channel signaling system.

Hereinafter, the descriptions of an approach for obtaining the limiting curve of MHP processing capacity affected by the load unbalancing and as to the influencing of the load unbalancing on the signaling message processing capacity of the common channel signaling system will be shown.

Define the following parameters:

v: ratio of available message service time to total CPU time in MHP,
$\lambda$: total workload of CCS system (messages/second)
N: number of MHP's in CCS system
r: unbalance factor (ratio of peak to average workload in each stage)
s: mean service time of MHP Since MHP generally consists of a processor and I/O device such as DMA(Direct Memory Access), the equation for the approximated mean service time S can be expressed as follows $$S = 2(CT_I + BT_D/U) + T_P \quad (1)$$

where

C: Number of instructions for DMA initialization,
$T_I$: Average execution time per instruction,
B: Mean message length(bits)
$T_D$: DMA data transfer time per unit data
U: Unit data length(bits)
$T_P$: Protocol processing time per message by CPU The limiting curve of MHP processing capacity depends upon mean service times of MHP and MHP with unbalanced traffic has the total workload of r$\lambda$N. Thus, we can denote the message service time V as $(s)(r\lambda/N)$. In equation(1), the mean length B can be substituted by $R/\lambda$, where R is the maximum bit rates of MHP. Hence, $$V = (r\lambda/N)[2(CT_I + (R/\lambda)T_D/U) + T_P],$$

which, after rearrangement with respect to the R, becomes $$R = 0.5UVN/(rT_D) - \lambda U(CT_I + 0.5T_P)T_D \quad (2)$$

FIG. 3 shows the limiting curve in the case that 16 message handling processors (M=16) are used in the common channel signaling system. In FIG. 3, the number λ of message corresponding to X coordinate of the point in which the line representing mean message length intersects the limiting curve, results in threshold of MHP processing capacity. For the numerical analysis, we assume that the target configuration has the following parameter values: $T_I=1.8$ μs, $T_D=2.75$ μs, $T_P=0.2$ ms, C=10, U=8, V=0.6. In this figure, the message processing capacity is about 28,000 messages per second for the perfect balanced workload (r=1) configuration and the mean message length of 15 octets which estimated for telephone application. In case of the unbalanced workload (r=1.4), however, the message processing capacity is less than 20,000 messages per second. Therefore, the load balancing is very important for the system performance.

SUMMARY OF THE INVENTION

Accordingly, the object of the present invention is to provide an internal traffic routing method in the internal network, by which the load balancing for the messages handling processors can be achieved to enhance the common channel signaling system performance.

To this end, in a common channel signaling system comprising a number of signaling terminals for receiving, through signaling data links, signaling messages including Circuit Identification Code(CIC), Originating Point Code(OPC) and Destination Point Code(DPC), a plurality of message handling processors connected to the signaling terminals via a message transfer network, and a number of user part processors connect to the message handling processors via a control interworking network, an internal routing method in the internal network for balancing the workload among the message handling processors in accordance with this invention comprises the steps of:

defining lower bits of the circuit identification code of the signaling messages as message handler selection code;

establishing routing table within the user part processors and the signaling terminals so that the signaling messages may be distributed equally to all active message handling processors on the basis of the remnant obtained when the message handler selection code is divided by the number of the active message handling processors; and performing the routing to the message handling processors from the user part processors or the signaling terminals.

DETAILED DESCRIPTION OF THE PREFERRED EMBODIMENTS

Figure 1:
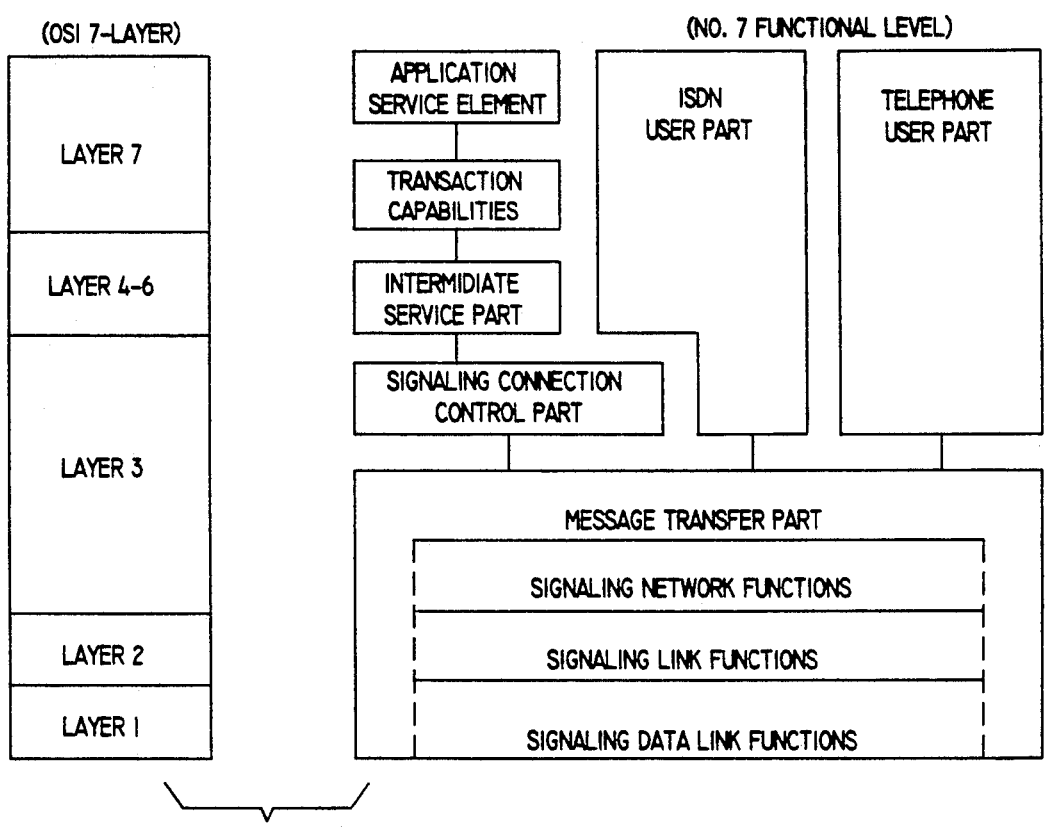
FIG. 1 illustrates relations between CCITT No. 7 function level structures and OSI layers.
Figure 2:
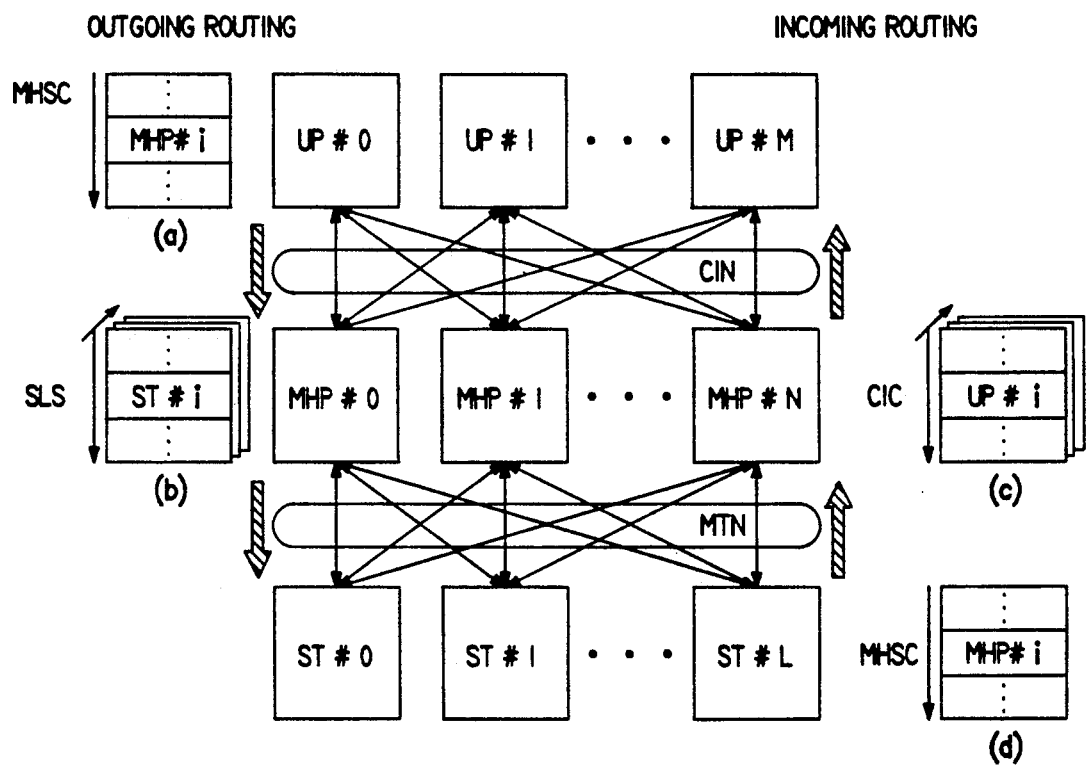
FIG. 2 shows the structure of a common channel signaling system in the electronic exchange.
Figure 3:
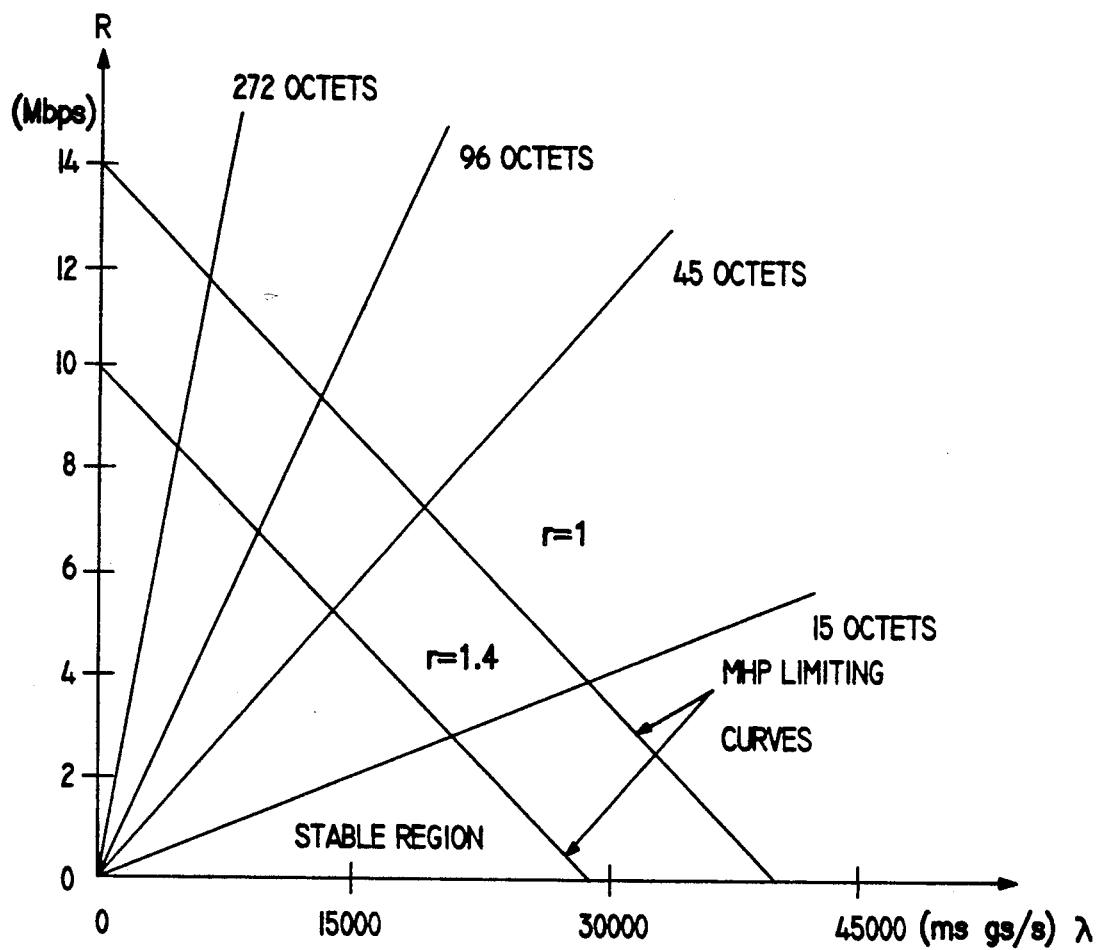
FIG. 3 shows the limiting curves of MHP processing capacity.
Figure 4:
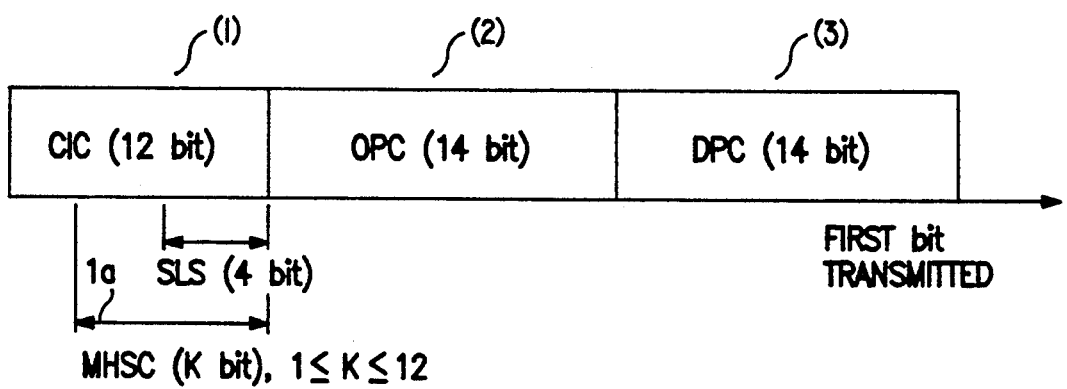
FIG. 4 shows CCITT No. 7 MSU(Message Signaling Unit) routing label.

FIG. 4 shows CCITT No. 7 MSU routing label. In FIG. 4, (1a) designates circuit identification code(CIC), (1a) designates message handler selection code(MHSC), (2) designates originating point code(OPC), and (3) designates destination point code, with the circuit identification code being used in this invention.

The CIC (1) is discrete random variable identifying trunk circuit between the telephone exchanges, and the trunk circuit is substantially uniformly used generally. Accordingly, the CIC (1) values contained in the common channel signaling messages which are generated or received by exchanges are uniformly distributed in the range between 0 and $(2^{12}-1)$. We define the lower K-bit of the CIC as MHSC($0 \leq K \leq 12$). Since the CIC (1) values are substantially uniformly distributed in the range between 0 and $(2^{12}-1)$, MHSC(1a) values are also substantially uniformly distributed in that range. Thus, the probability that any one of CIC values is to be allotted to a particular message becomes equal to $2^{-12}$. In other words, if the total number of signaling messages which are generated in the exchange is M, the number of the messages having any one of CIC values becomes equal to $M*2^{-12}$. At this time, if any one of MHSC(1a) values is expressed by binary number DDD ... D(D=0 or D=1), the CIC values containing this MHSC value are expressed by binary number XXX ... XDDDD ... D(X=0 or X=1) and for one MHSC value, there are total $2^{12-K}$ CIC values. Accordingly, the number of CIC(1) including any one of MHSC(1a) values depends on only K value rather than MHSC(1a) value and becomes constant $2^{12-K}$ for all MHSC(1a) values. Since the number of the messages having any one of CIC(1) values is equal to $M*2^{-12}$ and the number of CIC(1) having any one of the MHSC(1a) values is equal to $2^{12-K}$, the number of the messages having any one of the MHSC(1a) values becomes equal to $M*2^{-12}*2^{12-K}=M*2^{-K}$. Therefore, since the number of the messages depends on only K value, for all MHSC(1a), $M*2^{-K}$ messages are uniformly distributed. Accordingly, using this uniform distribution property of the MHSC, we can solve the load balancing and routing problem.

Hereinafter, the routing method according to the invention will be described more systematically.

(A) In the case of normal routing under no failure, the signaling messages are distributed to all active MHP's equally likely on the basis of the remnant (the remainder of the MHSC value divided by MHP number N). For example, the signaling message having the remnant 0 is routed to MHP#0, the signaling message having the remnant 1 is routed to MHP#1, the signaling message having the remnant i is routed to MHP#1, and the signaling message having the remnant(N−1) is routed to MHP#(N−1).

(B) When the failure of MHP node or related link occurs, renumbering the active MHP's with the virtual number of MHP(VMHP) is made and the takeover procedures start on the basis of the quotient (MHSC/N−i; MHSC values assigned to the failed MHP's (i) divided by available MHP number(N−i)).

For example, the signaling message having the quotient 0 is routed to VMHP #0, the message having the quotient 1 is routed to VMHP #1, the message having the quotient j is routed VMHP #j, and the message having the quotient (N−i−1) is routed to VMHP

Figure 5:
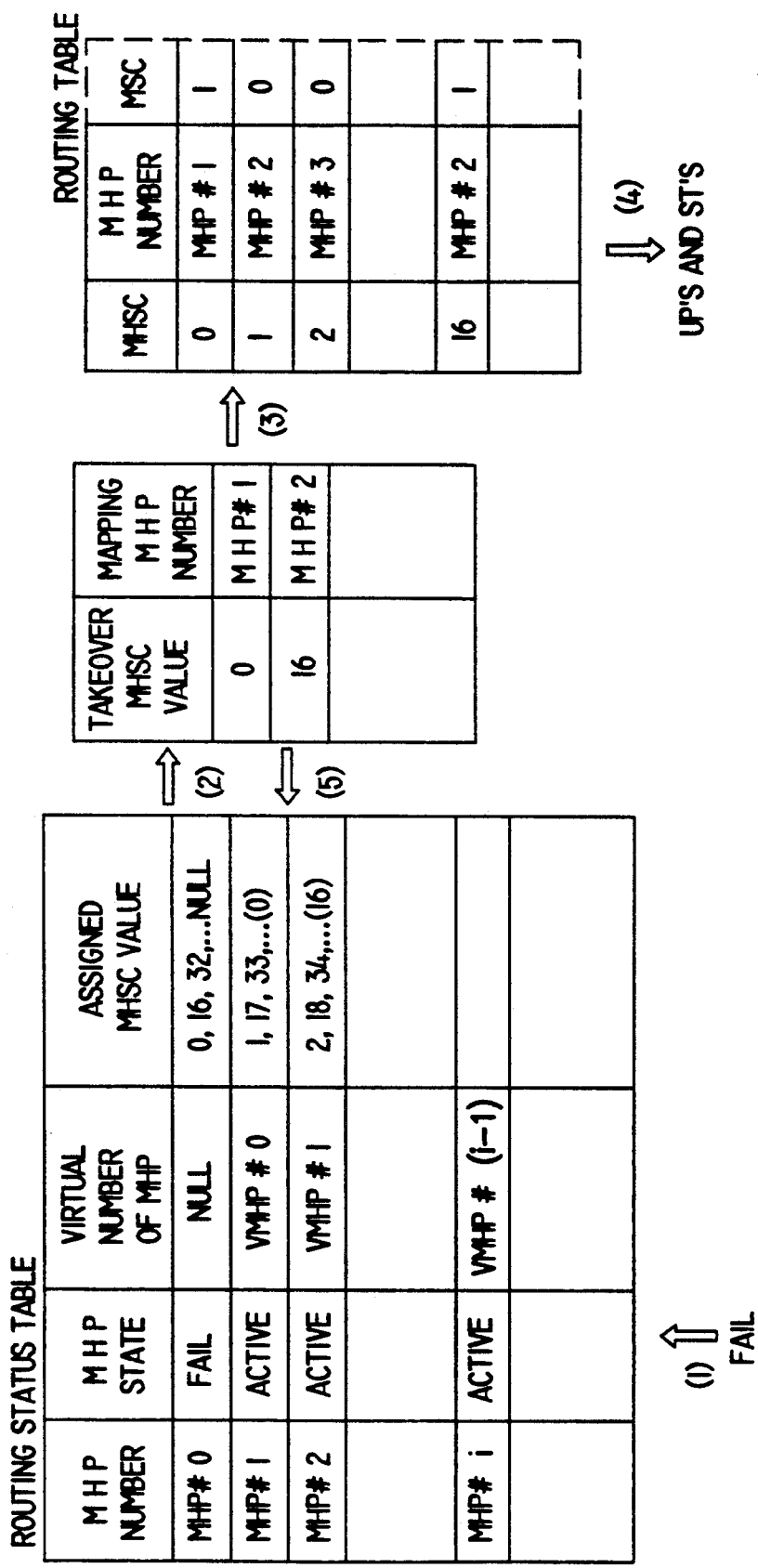
FIG. 5 illustrates an example of takeover procedures.

(N−i−1). At this time, in the case that the quotient is larger than (N−i) when available MHP number is equal to(N−i), after this quotient modular (N−i) being made, routing for the message is performed. FIG. 5 illustrates an example of such takeover procedures. Referring to this figure, the followings illustrate of takeover procedure when an MHP is failed.

(1) Notice that the MHP #0 goes fail (2) Search all MHSC's assigned to the failed MHP #0 from the routing status table and determine new MHP number for each searched MHSC according to the above-mentioned routing method.

(3) update the routing table, that is, change the failed MHP number to the new MHP number. Also, Mapping Status Code(MSC) is increased by TakeOver Indication Code(TOIC).

(4) Broadcast the routing table to all the user part processors and the signaling terminals (5) Finally, update the related informations of the routing status table so as to keep the routing state.

(C) When a failed MHP is recovered, the takeback procedure searches for MHSC's which are just before taken over, by means of Mapping Status Code(MSC) and TakeOver Indication Code(TOIC), and takes back the searched MHSC's, where the TOIC means the times of takeovers, i.e., the number of failed MHP's, and the MSC keeps the history of takeover.

Figure 6:
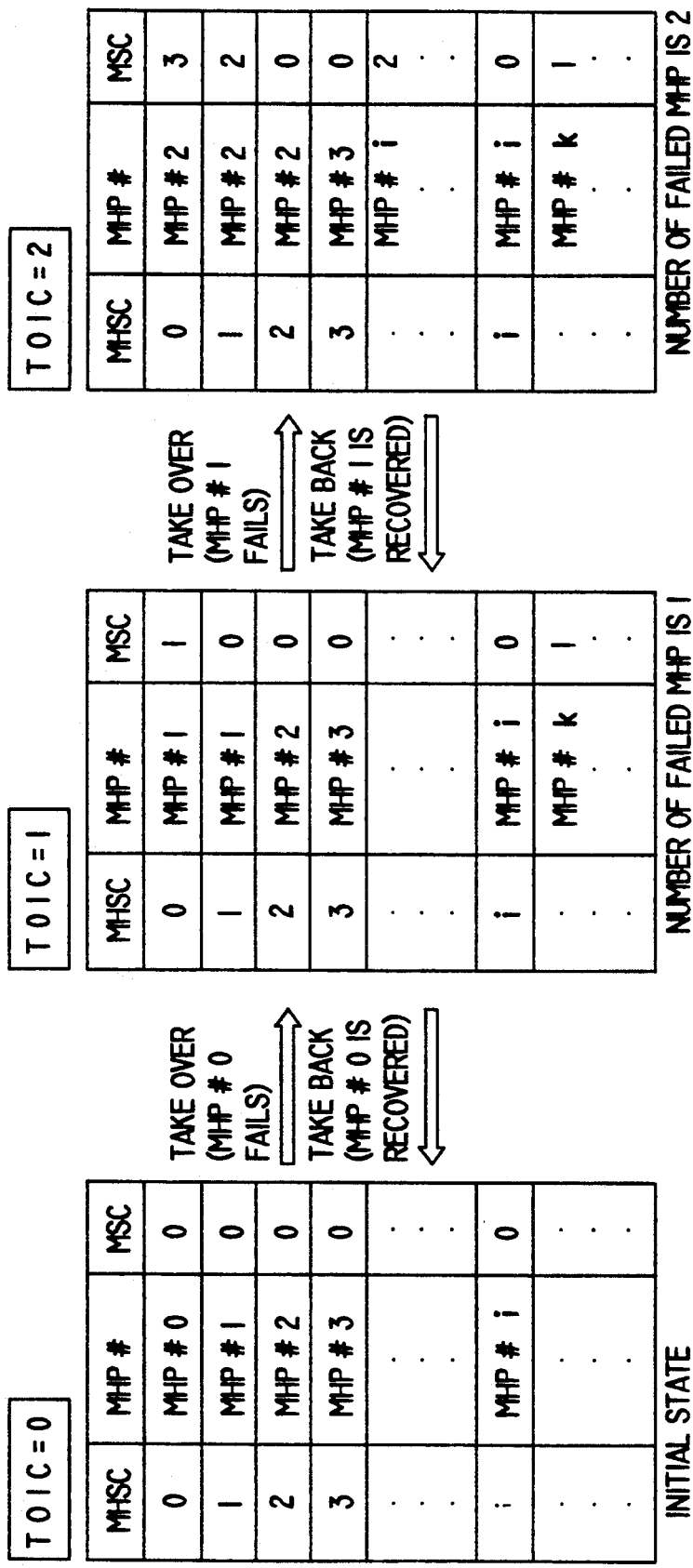
FIG. 6 illustrates an example of routing table changes in takeover/takeback.

Now, referring to FIG. 6 which illustrates an example of routing table changes in takeover/takeback, if MHP #0 is failed at first and MHP #1 secondly, the routing table transits from left to right according to the takeover procedure. In other words, when MHP #0 is failed, TakeOver Indication Code(TOIC) is increased by one.

And then, after MHSC's assigned to the MHP #0 are taken over, mapping status code (MSC) for the respective MHSC's is added by TOIC. Also, when MHP #1 is failed, takeover indication code is increased by one and hence becomes equal to 2.

And then, after MHSC's assigned to the MHP #1 are taken over, mapping status code(MSC) for the respective MHSC's is added by TOIC of 2. That is, MHSC 0 becomes equal to 3, MHSC 1 becomes equal to 2, MHSC K becomes equal to 1, and so on. Next, if any one MHP is recovered, the routing table goes in reverse direction by takeback procedure. At this time, the takeback procedure searches for MHSC's indicated by MSC's of which values are greater than or equal to TOIC of 2. The searched MHSC's are allocated to the recovered MHP. Also, the related MSC is subtracted by TOIC, and then TOIC is decreased by one. In such a manner, MHSC's which was taken over when MHP's are failed, are taken back, and thus the balancing of traffic load is achieved.

In table 1, there is shown an example of states in which messages are uniformly distributed by using the routing method according to the invention. In the case that the number of messages per second to be processed in common channel signaling system is equal to 28,000, MHP number is equal to 16, and the lower 8-bit of CIC is defined as MHSC(K=8), the messages in normal routing state are assigned to the respective MHP's in such a manner as shown in table 1, and thus the messages are uniformly distributed so that each of MHP's processes 1,750 signaling messages per second.

TABLE 1

| VMHP Number | MHP Number | Assigned MHSC values | Total Assigned Messages |
| --- | --- | --- | --- |
| VMHP #0 | MHP #0 | 0, 16, 32, 48, 64, 80, . . ., 224, 240 | 1,750 Messages |
| VMHP #1 | MHP #1 | 1, 17, 33, 49, 65, 81, . . ., 225, 241 | 1,750 Messages |
| VMHP #2 | MHP #2 | 2, 18, 34, 50, 66, 82, . . ., 226, 242 | 1,750 Messages |
| . | . | . | . |
| VMHP #15 | MHP #15 | 15, 31, 47, 63, 79, 95, . . ., 239, 255 | 1,750 Messages |

When MHP #0 is failed, the messages are distributed as shown in table 2(a) by means of the routing method according to the invention. In this case, one MHSC is further assigned to MHP #1 as compared with other MHP's. In the case that MHP #1 is also failed, as shown in table 2(b), 4 MHSC's are further assigned to MHP #2 and MHP #5 respectively, 3 MHSC's are further assigned to MHP #4, and 2 MHSC's are further assigned to remaining 11 MHP's respectively.

Therefore, although MHP's are successively failed, the workload is substantially uniformly distributed.

TABLE 2(a)

| VMHP Number | MHP Number | Preassigned MHSC Values | Takeovered MHSC |
| --- | --- | --- | --- |
| fail | MHP #0 | fail | fail |
| VMHP #0 | MHP #1 | 1, 17, 33, 49, 65, 81, . . ., 225, 241 | 0,240 |
| VMHP #1 | MHP #2 | 2, 18, 34, 50, 66, 82, . . ., 226, 242 | 16 |
| VMHP #2 | MHP #3 | 3, 19, 35, 51, 67, 83, . . ., 227, 243 | 32 |
| . | . | . | . |
| VMHP #14 | MHP #15 | 15, 31, 47, 63, 79, 95, . . ., 239, 255 | 224 |

TABLE 2(b)

| VMHP Number | MHP Number | Preassigned MHSC Values | Takeovered MHSC |
| --- | --- | --- | --- |
| fail | MHP #0 | fail | fail |
| fail | MHP #1 | fail | fail |
| VMHP #0 | MHP #2 | 2, 18, 34, 50, 66, 82, . . ., 226, 242 | 16, 1, 209, 0 |
| VMHP #1 | MHP #3 | 3, 19, 35, 51, 67, 83, . . ., 227, 243 | 32, 17 |
| VMHP #2 | MHP #4 | 4, 20, 36, 52, 68, 84, . . ., 228, 244 | 48, 33, 225 |

TABLE 2(b)-continued

| VMHP Number | MHP Number | Preassigned MHSC Values | Takeovered MHSC |
| --- | --- | --- | --- |
| . | . | . | . |
| . | . | . | . |
| . | . | . | . |
| VMHP #13 | MHP #15 | 15, 31, 47, 63, 79, 95, ..., 239, 255 | 244, 193 |

For the verification of the proposed routing method, we derived the approximated equation of the load unbalancing factor versus the number of failed MHP's. Also, we have compared the proposed method with the conventional method.

For the proposed routing method, the load unbalancing factor $r_i$ can be calculated approximately as follows:

$$r_i = \{A_0 + A_1 + A_2 + \ldots + A_{i-1} + A_i\}/\{2^k/(N-i)\}$$

where $$A_0 = \lceil 2^K/N \rceil,$$
$$A_1 = \lceil A_0/(N-1) \rceil,$$
$$A_2 = \lceil (A_0 + A_1)/(N-2) \rceil,$$
$$\vdots$$
$$A_i = \lceil (A_0 + A_1 + A_2 + \ldots + A_{i-1})/(N-i) \rceil,$$

and [X] is the smallest value among the integers greater than or equal to X.

The load unbalancing factor $r_i$ of the conventional method can be obtained approximately as follows:

$$r_i = \}A_0 + A_1 + A_2 + \ldots + (i+1)A_i\}/\{2^k/(N-i)\}$$

where, $$A_0 = [2^K/N],$$
$$A_1 = [A_0/N],$$
$$A_2 = [(A_0 + 2A_1)/N],$$
$$\vdots$$
$$A_i = [(A_0 + A_1 + A_2 \ldots + iA_{i-1})/N],$$

Figure 7:
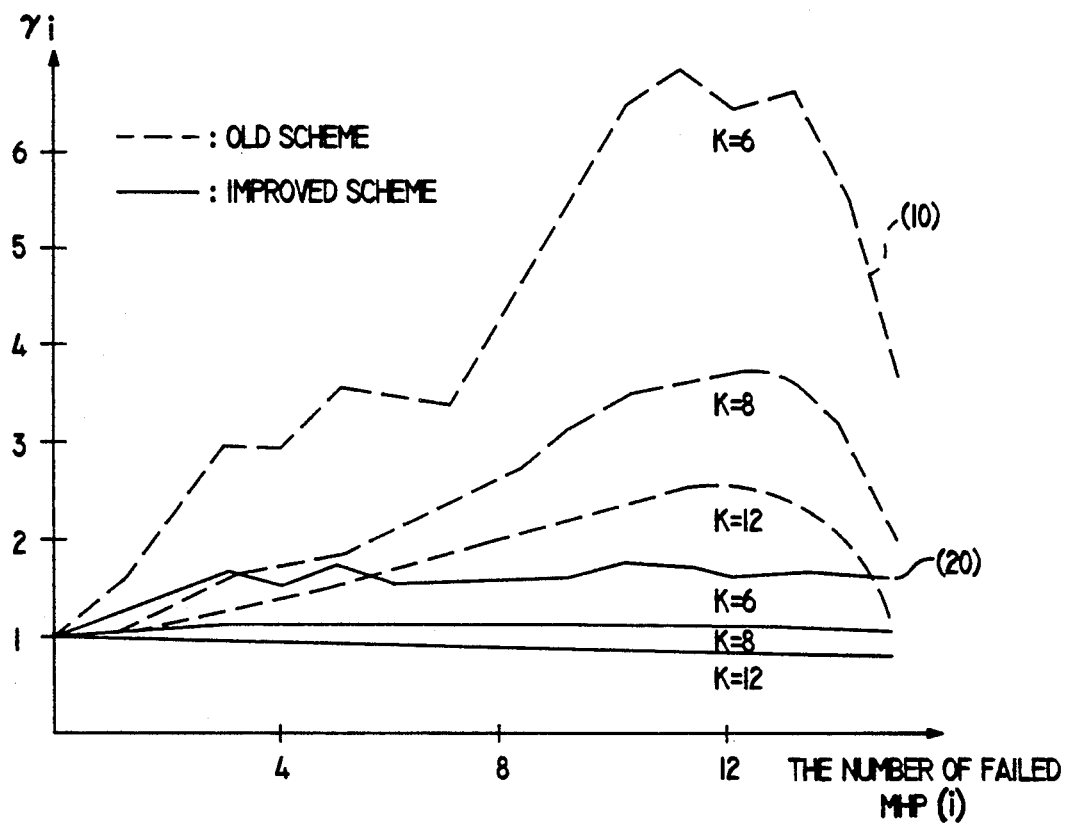
FIG. 7 shows load unbalancing factor curves when message handling processors are failed.

Now referring to FIG. 7 there are shown the curves of load unbalancing factor which are evaluated in the worst case. In this figure, (10) denotes the curve of load unbalancing factor according to the conventional routing method and (20) denotes the curve of load unbalancing factor according to the proposed routing method. As shown in figure, in the case that more than 4 MHP's are failed, the load unbalancing factor for the conventional method is increased by more than 2 times of the load unbalancing factor for the proposed routing method, thereby the system performance being degraded greatly.

Therefore, it will be understood that in the conventional method, the load balance is degraded as the number of failed MHP's increases. However, the proposed method can maintain the load balance among MHP's regardless of the number of failed MHP's.

As the advantages of the routing method according to the present invention, the load balance among MHP's can be achieved. The load balance results in the upgrading message handling capacity of the common channel signaling system.

Also, the signaling traffic can be easily distributed when MHP fails, or recovered. Moreover, the overflowed signaling traffic could be reduced easily by changing the telephone routing when MHP congestion happens.

What is claimed is:

1. In a common channel signaling system comprising a number of signaling terminals for receiving and sending, through signaling data links, signaling messages including circuit identification code (CIC), originating point code (OPC) and destination point code (DPC), a plurality of message handling processors each connected to each of the signaling terminals via a message transfer network, and a number of user part processors each connected to each of the message handling-handling processors via a control interworking network, an internal routing method in the internal network for balancing the workload among the message handling processors comprising the steps of:

defining lower bits of the circuit identification code of the signaling messages as a message handler selection code;

establishing a routing table within each of the user part processors and each of the signaling terminals so that the signaling messages may be distributed equally to all active message handling processors, on the basis of the remnant obtained when the message handler selection code is divided by the number of the active message handling processors; and performing the routing to the message handling processors from a selected one of the user part processors and the signaling terminals.

2. An internal routing method in the internal network as claimed in claim 1, wherein:

said establishing step further comprises takeover step reassigning the signaling messages of failed message handling processors to other available message handling processors in this case the parts of the message handling processors are failed so that the signaling messages of the failed message handling processors may be distributed equally to the other available message handling processors on the basis of the quotient obtained when the message handler selection code is divided by the number of available message handling processors.

3. An internal routing method in the internal network as claimed in claim 2, wherein;

said establishing step further comprises, in this case the failed message handling processors are recovered, takeback step searching for the takeovered message handler selection codes and allocating the searched message handler selection codes to the recovered message handling processors.

4. An internal routing method in the internal network as claimed in claim 1, wherein:

when assuming that the number of bits of the message handler selection code is K, K is greater than or equal to 1 and is smaller than or equal to 12, that is $1 \leq K \leq 12$.

* * * * *

UNITED STATES PATENT AND TRADEMARK OFFICE
CERTIFICATE OF CORRECTION

PATENT NO. : 5,271,003
DATED : December 14, 1993
INVENTOR(S) : Lee et al.

It is certified that error appears in the above-identified patent and that said Letters Patent is hereby corrected as shown below:

In column 2 at line 39 change "s:" to --S:--

In column 7 at line 21 change
"$A_1 = [A_0/(N - 10)],$" to --$A_1 = [A_0/(N-1)],$--

In column 7 at line 22 change
"$A_2 = [(A_0+A_1/N)/(N - 2)],$" to --$A_2 = [(A_0+A_1/N)/(N - 2)],$--

Signed and Sealed this

Twentieth Day of June, 1995

Attest:

BRUCE LEHMAN

*Attesting Officer*     *Commissioner of Patents and Trademarks*